United States Patent
Taylor et al.

(10) Patent No.: US 8,565,602 B2
(45) Date of Patent: Oct. 22, 2013

(54) WAVELENGTH AND POWER MONITOR FOR WDM SYSTEMS

(75) Inventors: Brian Dean Taylor, San Jose, CA (US); Alan C. Nilsson, Mountain View, CA (US); Konstantin Saunichev, San Jose, CA (US); Paul N. Freeman, Saratoga, CA (US)

(73) Assignee: Infinera Corporation, Sunnyvale, CA (US)

( * ) Notice: Subject to any disclaimer, the term of this patent is extended or adjusted under 35 U.S.C. 154(b) by 892 days.

(21) Appl. No.: 12/409,067

(22) Filed: Mar. 23, 2009

(65) Prior Publication Data

US 2010/0239246 A1 Sep. 23, 2010

(51) Int. Cl.
*H04J 14/02* (2006.01)

(52) U.S. Cl.
USPC .............................. 398/82; 398/85

(58) Field of Classification Search
USPC .......................... 398/82, 79, 83, 85
See application file for complete search history.

(56) References Cited

U.S. PATENT DOCUMENTS 6,229,938 B1 * 5/2001 Hibino et al. ................ 385/24

* cited by examiner

*Primary Examiner* — Jack Dinh
(74) *Attorney, Agent, or Firm* — David L. Soltz

(57) ABSTRACT

Consistent with the present disclosure, a transmitter is provided that includes first and second stages of wavelength locking circuitry. The first stage includes a tunable optical filter that sweeps through the spectrum of a WDM signal at a predetermined rate. A first photodiode senses a tapped portion of the output of the tunable filter. The remaining light is fed to the second stage, which includes a second optical filter, typically having a fixed transmission characteristic. A second photodiode senses the light that passes through the second filter. By sweeping the WDM spectrum the tunable filter can be used to identify the peaks in the WDM spectrum, with each peak corresponding to an optical signal wavelength and occurring at a particular time interval during the sweep. Thus, each optical signal wavelength can be associated with a particular time interval in the sweep, and, if no peak is identified during the sweep, a fault can be identified as either a laser failure or that the optical signal wavelength has drifted or "hopped" to another optical signal wavelength. Once having identified that an optical signal has hopped, the optical source outputting that optical signal can be appropriately controlled to output light at the correct wavelength.

23 Claims, 11 Drawing Sheets

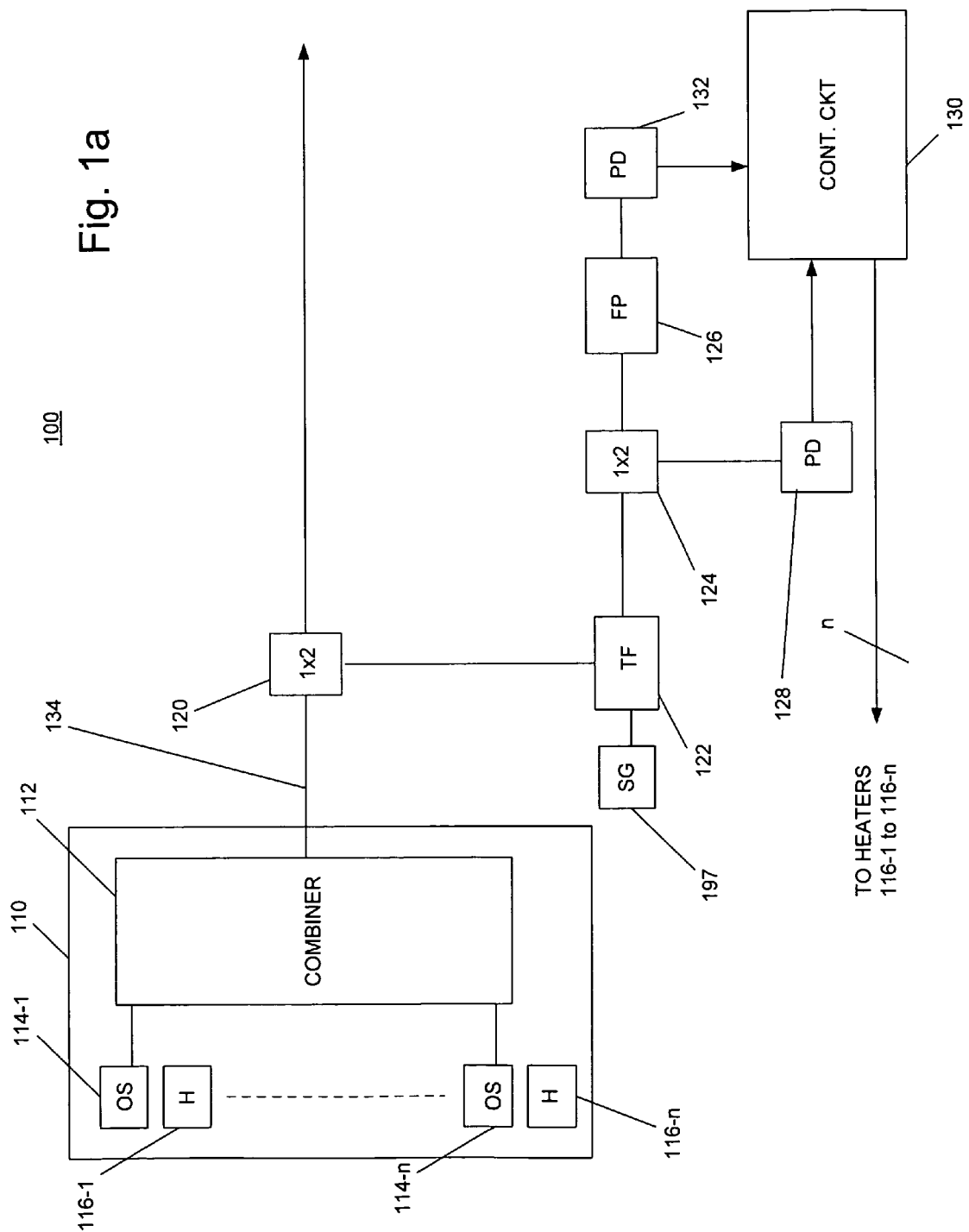

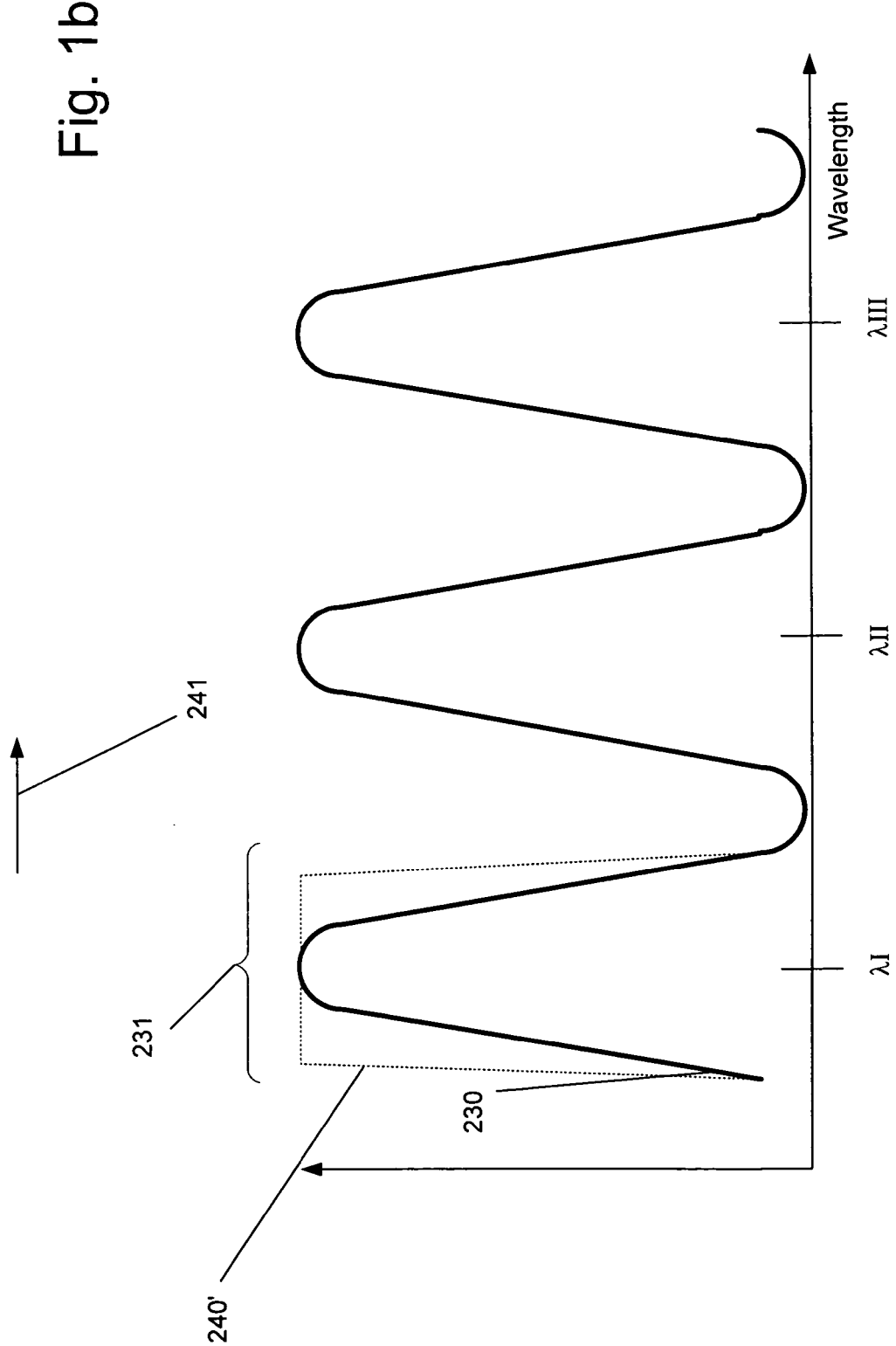

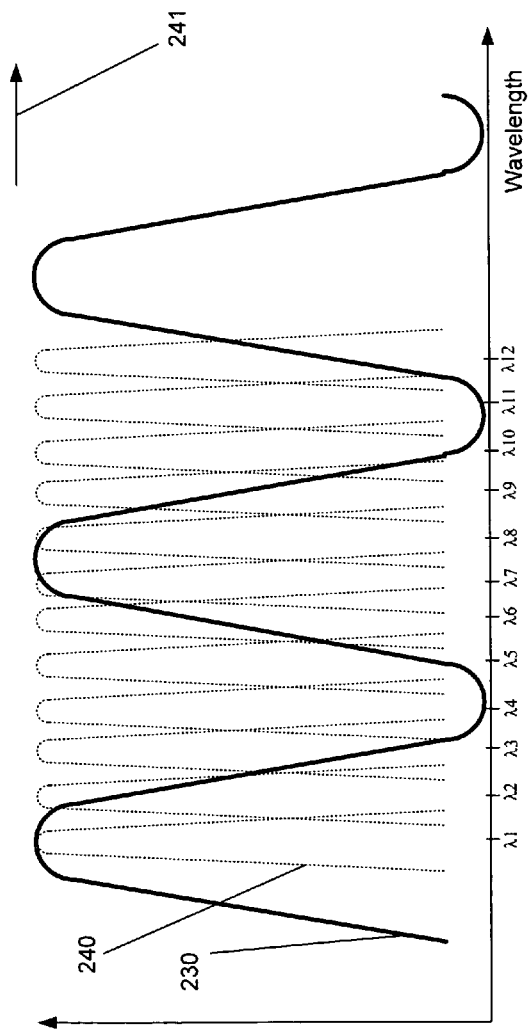
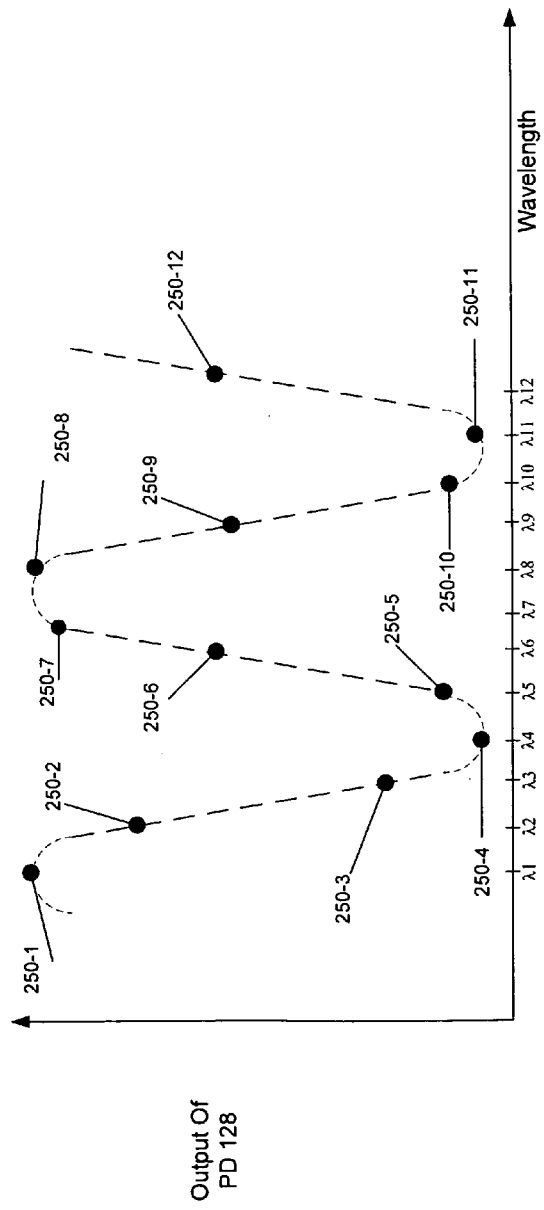

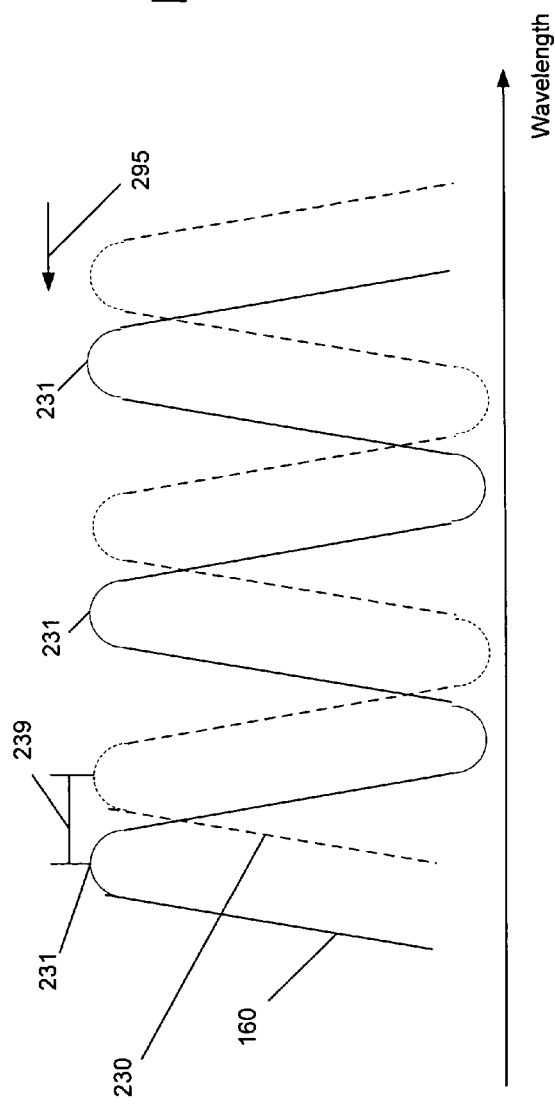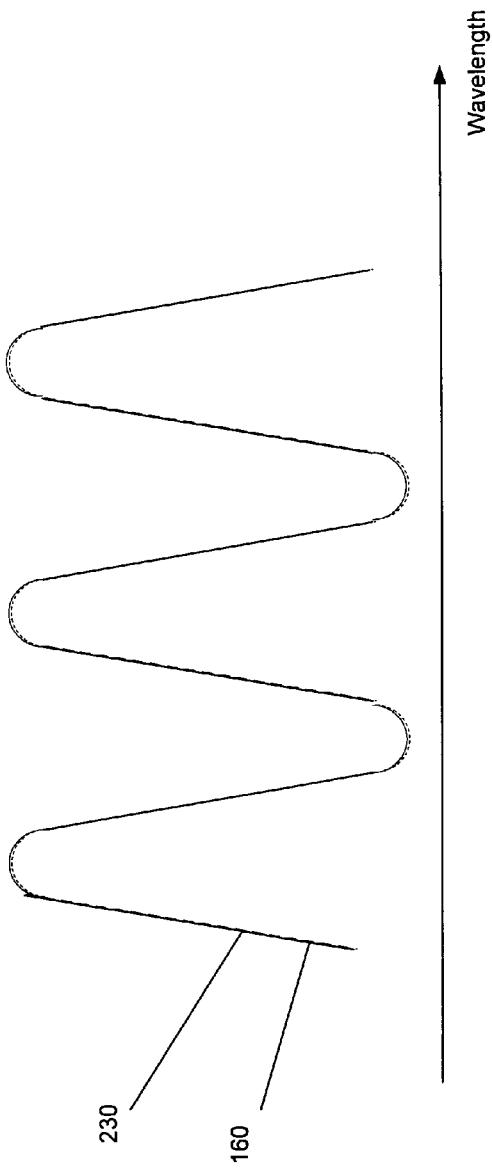

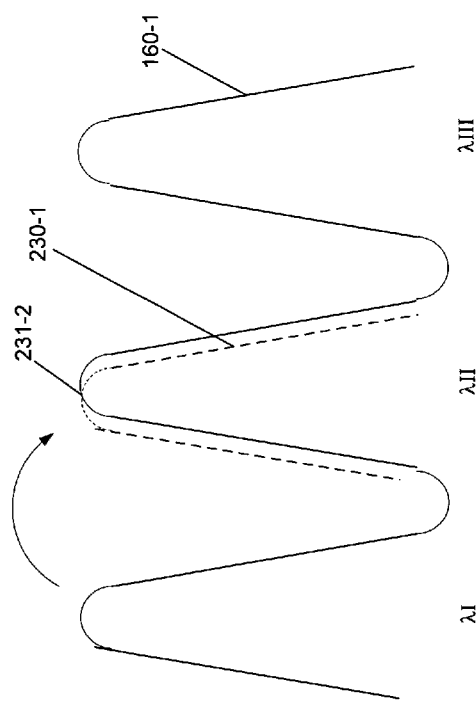
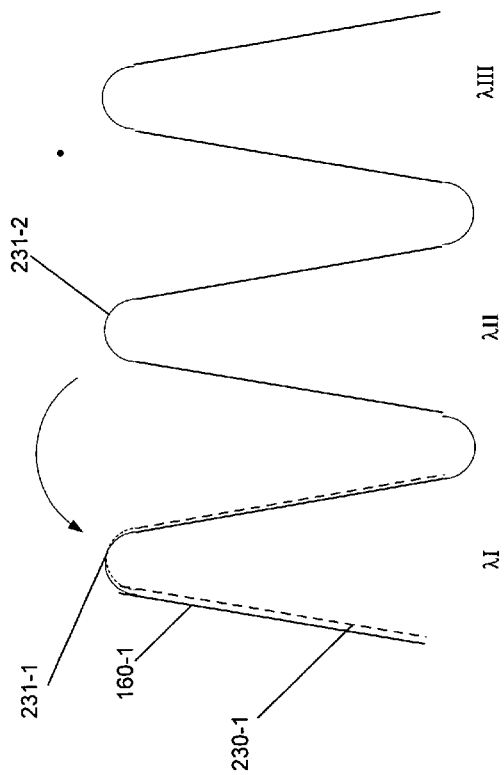

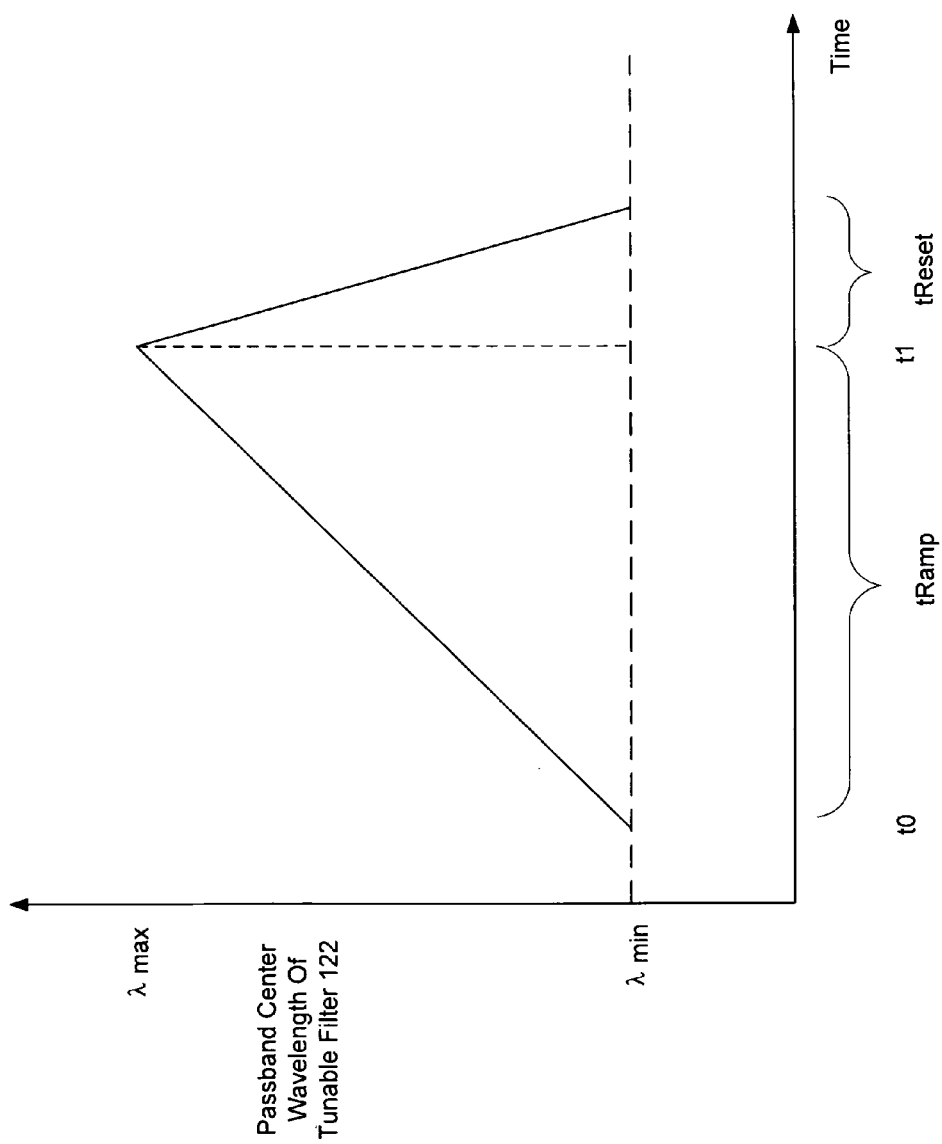

WAVELENGTH AND POWER MONITOR FOR WDM SYSTEMS

BACKGROUND OF THE INVENTION

Wavelength division multiplexed (WDM) optical communication systems are known, in which multiple optical signals, each having a different wavelength, are combined onto a single fiber. In such systems, the wavelength of each optical signal is typically controlled to be at or close to a particular value. Otherwise, if the wavelengths were permitted to drift, two or more optical signals may have the same wavelength and interfere with each other, resulting in unacceptable data transmission errors. Additionally, use of preset assignments for signal-bearing wavelengths enables effective use of preset optical filters in the transmission systems.

In order to increase the capacity of WDM optical signals, the wavelength spacing associated with the optical signals may be reduced so that more optical signals can be combined onto an optical fiber. With smaller spacings, however, the wavelength of each optical signal may more readily drift into that of another optical signal. Accordingly, the wavelengths in such higher capacity WDM systems may need to be more tightly controlled than those in lower capacity systems having few optical signal wavelengths.

Conventional wavelength locking schemes may use an etalon to lock an optical signal to a particular wavelength. The etalon, however, has a periodic transmission characteristic including a plurality of transmission peaks. Accordingly, it is possible for an optical signal wavelength to "hop" from one wavelength associated with one of the transmission peaks of the etalon to another wavelength associated with an adjacent transmission peak. In that case, the conventional wavelength locker would lock to the optical signal to the wrong wavelength, potentially resulting in two optical signals having the same wavelength. The optical signals or channels would therefore conflict resulting in disrupted data transmission.

Moreover, WDM optical communication systems may include a chain of optical amplifiers that provide gain to the optical signals. In such systems, if the optical signals are amplified unevenly, the over-amplified signals will receive more gain than the under-amplified signals as the optical signals propagate through the amplifier chain. As a result, the under-amplified signals may lose power and may not be adequately detected. Accordingly, the power levels of each optical signal are often adjusted to be substantially uniform in order that one signal is not amplified more than the other signals. The optical power associated with each optical signal is therefore monitored to insure that each optical signal has a desired power level.

Accordingly, there is a need for improved wavelength and power monitoring in a WDM optical communication system.

SUMMARY OF THE INVENTION

Consistent with an aspect of the present disclosure, an optical device is provided that includes a first filter, which is tunable and configured to receive a wavelength division multiplexed (WDM) signal. The first filter is configured to successively output each of a plurality of portions of the WDM signal. The optical device also includes a coupler configured to receive the plurality of portions of the WDM signals and supply a first optical output and a second optical output. A first photodiode is provided to sense the first optical output, and a second filter is provided that passes a portion of the second optical output. The optical device also includes a second photodiode configured to sense the portion of the second optical output.

Consistent with an additional aspect of the present disclosure, an optical device is provided that includes a plurality of optical sources, each of which supplies a corresponding one of a plurality of optical signals. Each of the plurality of optical signals has a corresponding one of a plurality of wavelengths. The optical device further includes an optical combiner configured to combine the plurality of optical signals into a wavelength division multiplexed (WDM) optical signal. A first coupler is provided to receive the WDM optical signal and supply a first part of the WDM optical signal and a second part of the WDM optical signal. A first filter, which is tunable, receives the first part of the WDM optical signal and successively supplies portions thereof. A second coupler is further provided that receives the successively supplied portions of the first part of the WDM optical signal and supplies first and second optical outputs. The optical device also includes a first photodiode configured to sense the first optical output of the second coupler and supply a first sense signal indicative of optical powers associated with the successively supplied portions of the first part of the WDM optical signal. In addition, a second filter is also provided that passes a portion of the second optical output, and a second photodiode senses the second optical output and supplies a second sense signal. Further, a control circuit is provided that receives the first and second sense signals and outputs a plurality of control signals. Each of the plurality of wavelengths is adjusted in response to a corresponding one of the plurality of control signals.

Additional objects and advantages will be set forth in part in the description which follows, and in part will be obvious from the description. The objects and advantages of the described herein will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF THE DRAWINGS

FIG. 1a is a block diagram of an optical transmitter consistent with the present disclosure;

FIG. 1b shows a WDM power spectrum and a transmission spectrum of a tunable filter consistent with the present disclosure;

FIG. 1c shows a WDM power spectrum and a transmission spectrum of an alternative tunable filter consistent with the present disclosure;

FIG. 1d shows the output of a photodiode as a function of wavelength consistent with an aspect of the present disclosure;

FIGS. 1e and 1f show a WDM power spectrum overlapping a transmission spectrum of an etalon consistent with an additional aspect of the present disclosure;

FIGS. 1g and 1h show a WDM power spectrum overlapping a portion of a transmission spectrum of an etalon consistent with a further aspect of the present disclosure;

FIG. 6 illustrates a plot of the of the passband center wavelength of a tunable filter as a function of time consistent with a further aspect of the present disclosure.

DESCRIPTION OF THE EMBODIMENTS

Figure 2:
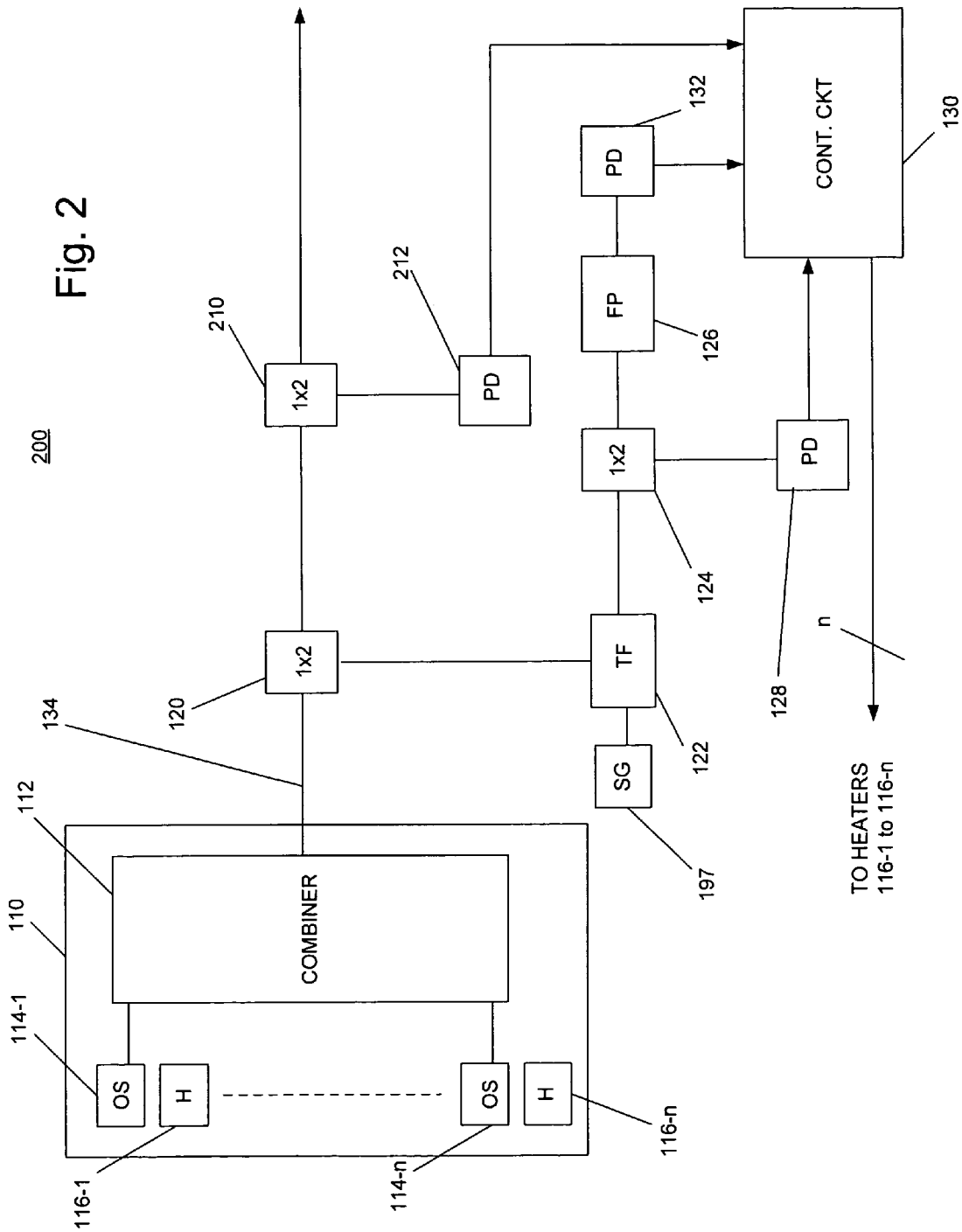
FIG. 2 is an example of an optical transmitter consistent with a further aspect of the present disclosure.

Consistent with the present disclosure, a transmitter is provided that includes first and second stages of wavelength locking circuitry. The first stage includes a tunable optical filter that sweeps through the power spectrum of a WDM signal at a predetermined rate. A first photodiode senses a tapped portion of the output of the tunable filter. The remaining light is fed to the second stage, which includes a second optical filter, typically having a fixed transmission characteristic. A second photodiode senses the light that passes through the second filter. By sweeping the WDM spectrum the tunable filter can be used to identify the peaks in the WDM spectrum, with each peak corresponding to an optical signal wavelength and occurring at a particular time interval during the sweep. Thus, each optical signal wavelength can be associated with a particular time interval in the sweep, and, if no peak is identified during the sweep, a fault can be identified as either a laser failure or that the optical signal wavelength has drifted or "hopped" to another optical signal wavelength. Once identified as an optical signal that has hopped, the optical source outputting that optical signal can be appropriately controlled to output light at the correct wavelength.

Reference will now be made in detail to the present exemplary embodiments, examples of which are illustrated in the accompanying drawings. Wherever possible, the same reference numbers will be used throughout the drawings to refer to the same or like parts.

FIG. 1a illustrates a transmitter 100 consistent with an aspect of the present disclosure. Transmitter 100 includes a plurality of optical sources 114-1 to 114-n, each of which including a laser and a modulator, for example, as described, for example, in U.S. Pat. Nos. 7,079,715 and 7,136,546, the contents of both of which are incorporated herein by reference. Each of optical sources 114-1 to 114-n, which may include a distributed feedback (DFB) laser, outputs a corresponding one of a plurality of optical signals, each of which having a corresponding one of a plurality of wavelengths. The optical signals are fed to optical combiner 112, which may include an arrayed waveguide grating or other known optical combiner. Optical combiner 112 multiplexes or combines the received optical signals into a wavelength division multiplexed (WDM) optical signal, which is output onto optical path 134, such as an optical fiber.

A plurality of wavelength tuning elements, such as thin film heaters 116-1 to 116-n may also be included in transmitter 100 in order to thermally adjust the wavelength of each of optical sources 114-1 to 114-n. Optical sources 114, heaters 116, and optical comber 112 may be provided on a common substrate 110.

The WDM optical signal is next fed to a 1×2 coupler, such as a beam splitter or tap 120, which power splits or divides the WDM signal and supplies a first portion (which itself constitutes a WDM signal) to tunable filter 122, while a remaining or second portion of the WDM signal continues to propagate along optical path 134. A 2×2 coupler may also be used in place of tap 120.

Sweep generator circuit 197 supplies a voltage, for example, to tunable filter 122, which also receives the output from combiner 112. As shown in FIG. 1b (which shows two overlapping plots of signal power as a function of wavelength for the WDM signal (solid curve) and transmission as a function of wavelength for tunable filter 122 (dotted curve), tunable filter 122 has a bandpass 240' that sweeps, as the voltage output from sweep generator circuit 197 is ramped, over a range of wavelengths, such as a range of wavelengths encompassing the optical signal wavelengths or spectrum of the WDM signal (a portion of which is shown as WDM power spectrum 230 in FIG. 1b). Thus, as the tunable filter bandpass 240 scans or sweeps across the WDM power spectrum 230 in a direction indicated by arrow 241, consecutive spectral portions of the WDM signal are successively output to 1×2 coupler 124.

In the example shown in FIG. 1b, bandpass 240' is preferably spectrally wide enough to encompass substantially the spectrum (e.g., spectrum 231 in FIG. 1b) of just one of the optical signals combined by combiner 112 into the WDM signal. As tunable filter 122 is swept, the center wavelength of bandpass 240' increases from λI to λIII, while the spectral width of the bandpass 240' remains substantially the same. Accordingly, for example, light having a relatively low wavelength (e.g., λI) may initially be output from tunable filter 122, while later in the sweep, light having a relatively high wavelength (e.g., λIII) may be output. At each such center wavelength, a different portion of the WDM optical signal is output from tunable filter 122.

FIG. 1c shows an example in which tunable filter 122 has a narrower bandpass 240 than bandpass 240' shown in FIG. 1b. Here, bandpass 240 sweeps over a range of wavelengths extending from λ1 to λ12.

Tunable filter 122 may be selected from the group consisting of a tunable filter based on micro-electromechanical system (MEMS) actuation, a tunable ring resonator, a tunable fiber bragg grating, a tunable Mach-Zehnder interferometer, a tunable etalon, and a tunable Michelson interferometer. Other known tunable filters may also be used. In addition, tunable filters are commercially available from Dicon, Axsun, and Micron Optics, for example.

The scanned or swept portions of the WDM signal portion output from filter 122 are again power split or divided by 1×2 coupler 124, and a first part of the WDM signal portion or first optical output is fed to photodiode 128 while a second WDM signal portion or second optical output is fed to an optical filter, such as an etalon or Fabry-Perot (FP) filter 126. A photodiode 132 senses light output from FP filter 126 and supplies an output to control circuit 130. Photodiode 128 also supplies an output to control circuit 130.

FIG. 1d shows a plot of the voltage or sense signal output of photodiode 128 as a function of wavelength, while bandpass 240 in FIG. 1c is swept from from λ1 to λ12. Although the voltage output is continuous, discrete voltages are shown as points 250-1 to 250-12, each of which is associated with a corresponding one of wavelengths λ1 to λ12, respectively. In the example shown in FIGS. 1c and 1d, the voltages output from photodiode 128 are preferably integrated over time, in order to determine the entire optical power of the optical signal portion supplied thereto. On the other hand, in the example shown in FIG. 1b, photodiode 128 outputs a peak voltage when the center wavelength of bandpass 240' matches the optical signal wavelength, e.g. wavelength λI. Accordingly, by measuring the peak voltage, the power of one of the optical signals can be determined without further integration.

FIG. 1e illustrates an example of the transmission spectrum 160 of FP filter 126 (solid curve) as well as WDM power spectrum 230 (dashed curve). In FIG. 1e, due to thermal variations or other environmental considerations, for example, the wavelengths of the optical signals output from optical sources 114-1 to 114-n may vary or drift spectrally (see gap 239). The wavelengths at peaks 231 of FP filter transmission spectrum 160, however, are typically aligned with the correct wavelengths associated with each of the optical signals output from sources 114-1 to 114-n. Based on the outputs of photodiodes 128 and 132, control circuit 130 generates appropriate control signals to heaters 116-1 to 116-n, to thereby adjust the temperature, for example, and thus, the optical signal wavelength of optical sources 114-1 to 114-n to align with desired locations with respect to peaks 231 of FP filter 126. As a result, as shown in FIG. 1f, each of optical sources may be appropriately tuned or spectrally shifted, as indicated by arrow 295, to the correct wavelength. Other known wavelength locking techniques may also be used to adjust the optical signal wavelengths in response to the control signals supplied from control circuit 130.

Operation of control circuit 130 will next be discussed in greater detail with reference to FIGS. 1g and 1h. FIG. 1g illustrates an example in which a portion of WDM power spectrum 230-1 corresponding to one of the optical signals output from optical sources 114. Here, WDM power spectrum 230-1 has a correct wavelength of $\lambda 1$, but has hopped to an incorrect wavelength $\lambda 2$ associated with peak 231-2 of FP filter transmission spectrum portion 160-1. As noted above, conventional wavelength locking techniques may not be able to resolve the correct wavelength for such a hopped signal, because the wavelength is typically locked to the nearest FP filter peak, not necessarily the correct peak.

Consistent with an aspect of the present disclosure, the sense signal output from photodiode 128 is processed in a known manner by control circuit 130 using a known analog-to-digital converter circuit (ADC) to generate a digital representation of the WDM power spectrum 230. The digital representation may be compared with an expected or predetermined spectrum stored in control circuit 130 to determine whether there is adequate optical power at each optical signal wavelength. Alternatively, control circuit 130 may be programmed to compare the output of photodiode 128 with an expected voltage, such as a peak voltage, to be observed at a predetermined time interval during the sweep. The predetermined time interval corresponds to the length of time it takes for passband 240 of 122 tunable filter to reach a particular wavelength (e.g., wavelength $\lambda 8$ in FIGS. 1c and 1d), which may correspond to a particular optical signal wavelength.

If control circuit 130 determines that there is little optical power at a particular optical signal wavelength, the optical signal may have hopped to the wavelength of an adjacent optical signal. Appropriate control signals may then be generated by control circuit 130 and supplied to one of heaters 116-1 to 116-n to adjust one of optical sources 114-1 to 114-n emitting the optical signal at the faulty wavelength. Finer wavelength tuning using FP filter 126 and the output of photodiode 132 can then be performed in order to further adjust the optical signal wavelength once it is closer to correct peak 231 of the transmission spectrum. Thus, for example, as shown in FIG. 1h, the wavelength of WDM power spectrum portion 230-1 is shifted to the correct wavelength, wavelength $\lambda 1$, and is aligned with peak 231-1.

In addition, to facilitating wavelength locking, photodiode 128 may also be used to measure the power of the various optical signals that constitute the WDM signal output from combiner 112.

In the above example, tunable filter 122 may sweep continuously over the WDM power spectrum 230. It is understood, however, that the center wavelength of the passband of tunable filter 122 may, through an iterative process, pass back and forth over about an individual peak, identify the optical signal wavelength associated with that peak, and then use the same iterative process to identify another peak. This process, however, may be relatively time consuming, as opposed to the process involving a continuous sweep described above.

FIG. 2 illustrates a transmitter 200 consistent with another example of the present disclosure. Transmitter 200 is similar to transmitter 100, but includes an additional tap or 1×2 coupler 210 to further power split or divide a portion of the output from coupler 120 and supply it to photodiode 212. Photodiode 212, in turn, provides a further sense signal to control circuit 130 that is indicative of the aggregate power, for example, of the optical signals that constitute the WDM signal output from combiner 112. Control circuit 130 receives the output from photodiode 212 in order to perform additional power monitoring of the WDM signal output from combiner 112.

Figure 3:
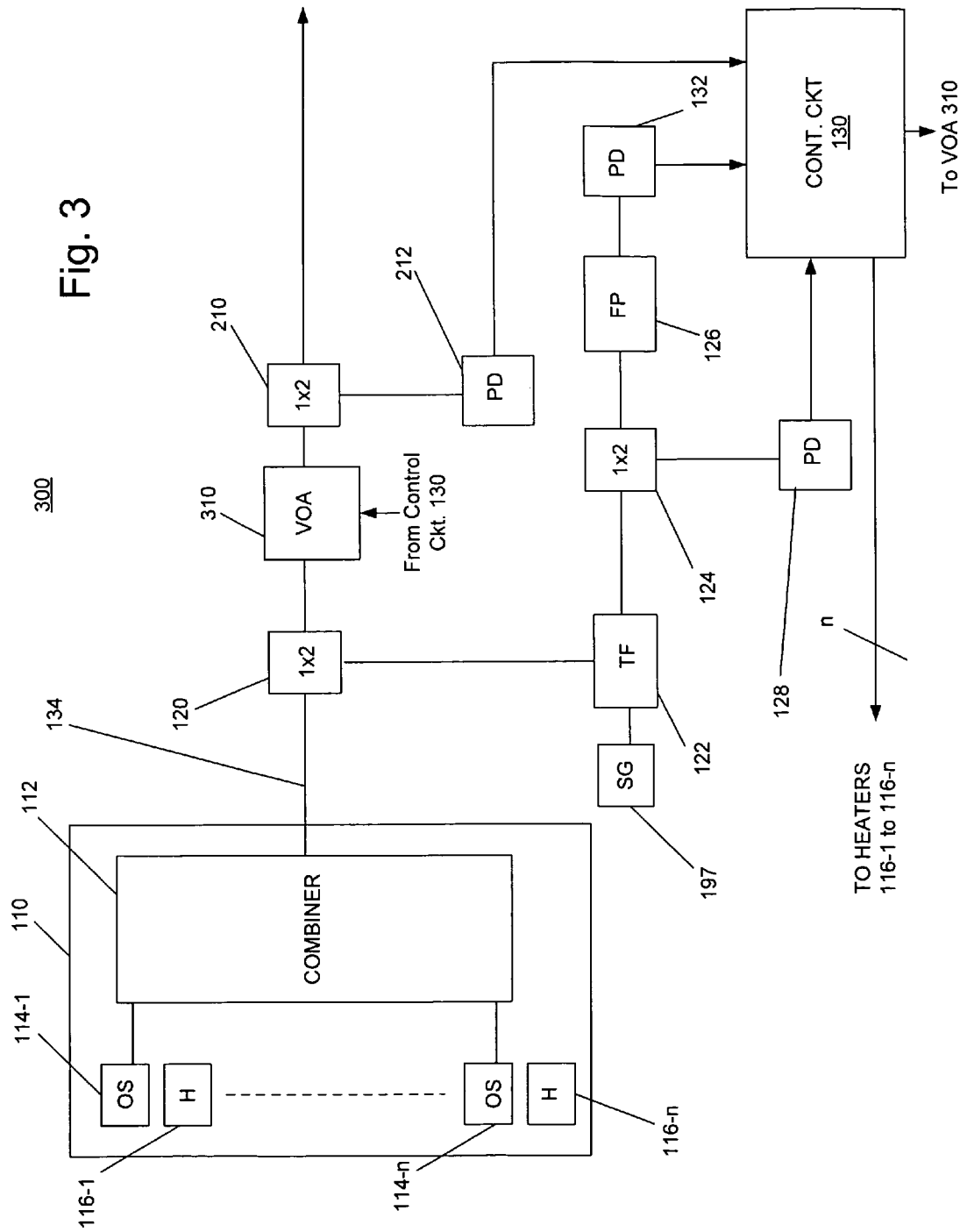
FIG. 3 is another example of an optical transmitter consistent with an additional aspect of the present disclosure.

FIG. 3 illustrates a transmitter 300 consistent with a further example of the present disclosure. Transmitter 300 differs from transmitter 200 in that it includes a variable optical attenuator 310 provided between couplers 120 and 210. In the example shown in FIG. 3, control circuit 130 outputs a further control signal to VOA 310 based on the output of photodiode 212 and/or one or both of the outputs of photodiodes 128 and 132. Accordingly, the WDM signal passing through VOA 310 is appropriately attenuated, and the power of the signal is adequately controlled. Accordingly, the optical signals that constitute the WDM signal may be adjusted to have substantially uniform power.

Figure 4A:
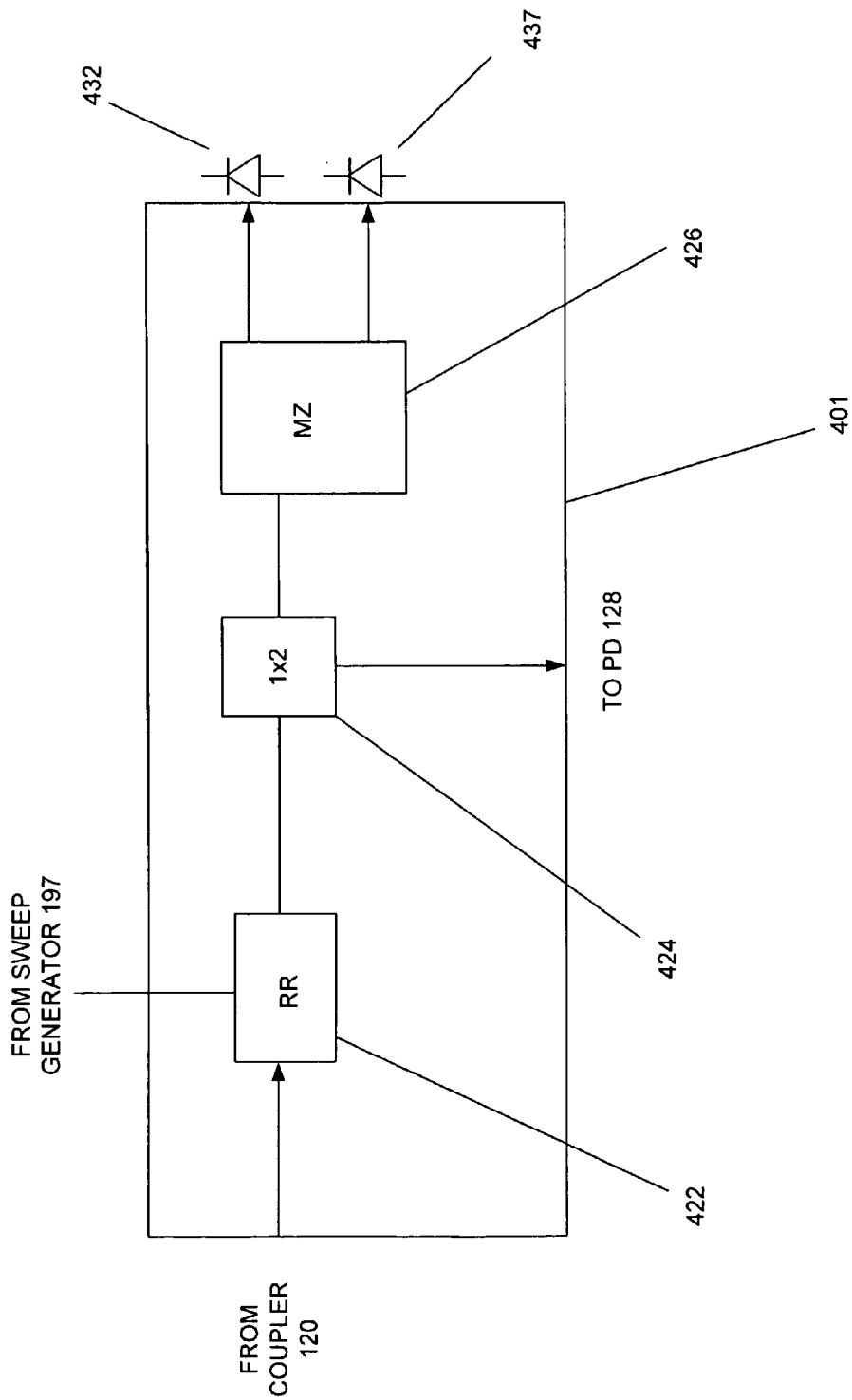
FIG. 4a shows a block diagram of a planar lightwave circuit consistent with an aspect of the present disclosure.

FIG. 4a illustrates an example consistent with the present disclosure whereby tunable filter 122, coupler 124 and filter 126 are replaced by planar lightwave circuit (PLC) 400 provided on substrate 410. PLC 400 includes a tunable filter, such as a tunable ring resonator 422, which receives the WDM output from coupler 120, and a ramp voltage from sweep generator 197. A 1×2 coupler 424 receives the output from ring resonator 422 and supplies a first portion thereof to photodiode 128 and a second portion to a reference filter, such as a Mach-Zehnder (MZ) interferometer 426, which, in turn, supplies optical outputs to photodiodes 432 and 437. Each of ring resonator 422, coupler 424, and Mach-Zehnder interferometer 426 may include silica containing waveguides provided on substrate 410, which may include silicon. Ring resonator 422, coupler 424, and MZ interferometer 426 operate in much the same fashion as tunable filter 122, coupler 124, and filter 126, respectively. Thus, PLC 400 may replace tunable filter 122, coupler 124, and filter 126 shown in FIGS. 1-3.

Figure 4B:
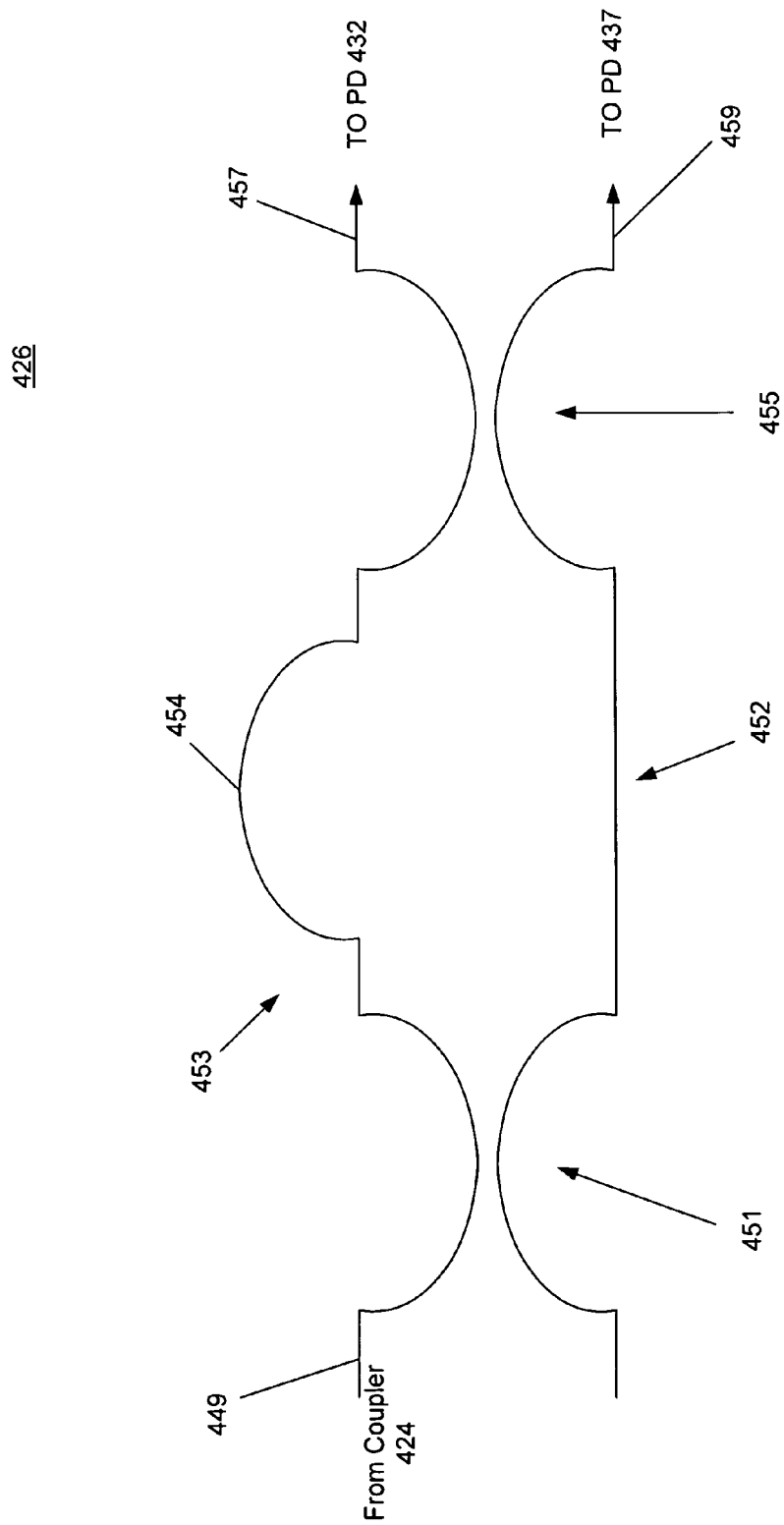
FIG. 4b illustrates a Mach-Zehnder interferometer consistent with an aspect of the present disclosure.

An example of MZ interferometer 426 is shown in detail in FIG. 4b. MZ interferometer 426 includes a coupling portion 451 having a waveguide 449 that receives light from coupler 424. Coupler portion 451 power splits the light and supplies a first portion to waveguide or arm 453 and a second portion to arm 452. Arm 453 includes a delay portion 454, such that the first (delayed) light portion and the second light portion interfere with each other in coupler portion 455. In particular, depending on the wavelength of light supplied from coupler 424, the first and second portions of light will destructively or constructively interfere with each other in coupler portion 455, such that light is either output on waveguide 457 or waveguide 459. Alternatively, varying amounts of light may be output on waveguides 457 and 459. Photodiodes 432 and 437 receive the light output from waveguides 457 and 459, respectively, and generate electrical or sense signals in response thereto. Control circuit 130 receives the electrical outputs from photodiodes 432 and determines the power associated with the light supplied by coupler 424 based on a comparison, for example, between the sense signals.

It is noted that tunable filter 122 may be either thermally tuned with a known ring resonator or Mach-Zehnder interferometer or may be mechanically tuned, for example, with a micro electromechanical system (MEMS). Typically, tunable filter devices such as these have limited durability and are swept a limited number of cycles over the lifetime of the device. Thus, it may be advantageous for tunable filter 122 to sweep at a faster rate during system start-up, for example, so that the optical signals may be more rapidly controlled. During normal operation, once the optical sources have been stabilized, the sweep rate can be decreased to conserve the number of cycles. In addition, the sweep rate may be linear with respect to time or may be non-linear.

Figure 5:
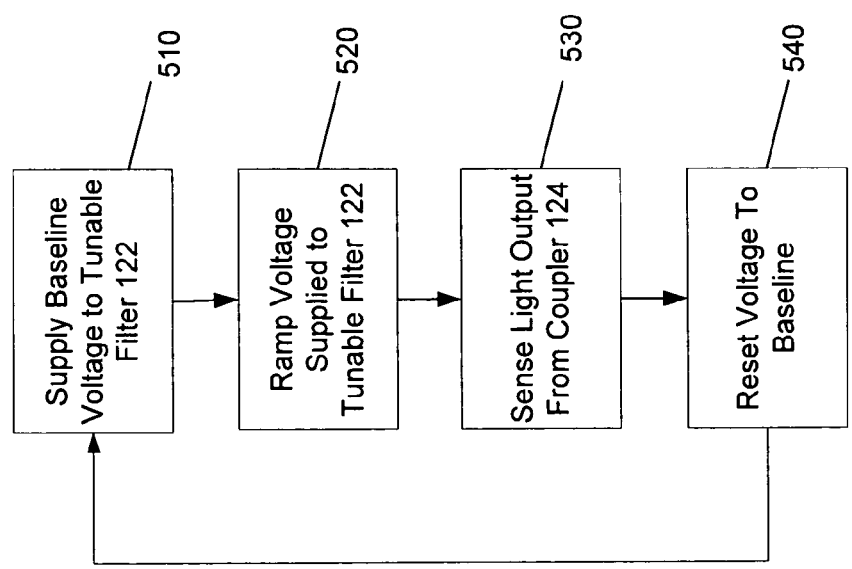
FIG. 5 is a flowchart of a method consistent with an additional aspect of the present disclosure.

An exemplary method for sweeping the bandpass of filter 122, as well as ring resonator 122, will next be described with reference to FIGS. 5 and 6. In step 510 (FIG. 5), an initial voltage having a predetermined value or a baseline voltage is supplied by sweep generator 197 to tunable filter 122 at time t0 (see FIG. 6). As a result, the passband center wavelength of tunable filter 122 may be set to a minimum wavelength $\lambda$min. Sweep generator 197 may then ramp the voltage supplied to tunable filter 122 (or ring resonator 422) during a ramping period tRamp having a duration t1-t0 so that the bandpass center wavelength sweeps across the WDM power spectrum 230 (step 520, see also FIG. 6) to a maximum wavelength $\lambda$max. Preferably, the sweep is linear in wavelength or frequency, such that the sweep is in substantially equal spectral increments. In one example, since application of a linearly increasing voltage to tunable filter 122 may not necessarily result in a linear sweep in wavelength, appropriate circuitry may be provided to adjust the voltage applied to tunable filter 122 so that the passband center wavelength increases linearly with time, as shown in FIG. 6.

During the sweep, photodiode 128 senses a portion of the light output from tunable filter 122 (step 530). Once the ramp voltage reaches a maximum value at time t1 (step 540), it is reset to the baseline value during a time interval tReset (see FIG. 6) so that the passband center wavelength is rapidly reduced to the minimum wavelength $\lambda$min. Steps 510, 520, 530, and 540 of FIG. 5 may then be repeated. Preferably, the duration of time interval tRamp is substantially longer than the duration of time interval tReset (see FIG. 6).

The WDM system described herein may transmit optical signals separated from one another by 25 GHz in frequency and are susceptible to frequency or wavelength hopping under some conditions. The locking circuitry discussed herein, however, may limit or prevent such hopping and facilitate transmission of closely spaced optical signals.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An optical device, comprising:
   a first filter, the first filter being tunable and configured to receive a wavelength division multiplexed (WDM) signal, the first filter being configured to successively output each of a plurality of portions of the WDM signal; and
   a coupler configured to receive the plurality of portions of the WDM signals and supply a first optical output and a second optical output;
   a first photodiode configured to sense the first optical output;
   a second filter configured to pass a portion of the second optical output; and
   a second photodiode configured to sense the portion of the second optical output.

2. An optical device in accordance with claim 1, wherein the first photodiode generates a first sense signal in response to the first optical output, and the second photodiode generates a second sense signal in response to the second optical output, the optical device further including:
   a control circuit configured to receive the first and second sense signals and output a plurality of control signals; and
   a plurality of optical sources, each of the plurality of optical signals supplying a corresponding one of a plurality of optical signals, each of the plurality of optical signals having a corresponding one of a plurality of wavelengths, the plurality of optical signals constituting the WDM signal, the plurality of wavelengths being adjusted in response to the plurality of control signals.

3. An optical device in accordance with claim 2, wherein the coupler is a first coupler, the optical device further including:
   a second coupler; and
   an optical combiner, the optical combiner supplying a combiner output, the second optical coupler receiving the combiner output and supplying a portion of the combiner output as the WDM signal.

4. An optical device in accordance with claim 3, wherein the portion of the combiner output is a first portion of the combiner output, the optical device further including a variable optical attenuator (VOA) configured to selectively attenuate a second portion of the combiner output.

5. An optical device in accordance with claim 2, further including a substrate,
   wherein the plurality of optical sources and the optical combiner are provided on the substrate.

6. An optical device in accordance with claim 2, wherein each of the plurality of optical sources includes a distributed feedback laser.

7. An optical device in accordance with claim 1, wherein the first photodiode generates a first sense signal in response to the first optical output, and the second photodiode generates a second sense signal in response to the second optical output, the optical device further including:
   a substrate;
   a control circuit configured to receive the first and second sense signals and output a plurality of control signals; and
   a plurality of optical sources provided on the substrate, each of the plurality of optical signals supplying a corresponding one of a plurality of optical signals, each of the plurality of optical signals having a corresponding one of a plurality of wavelengths, the plurality of optical signals constituting the WDM signal,
   a plurality of wavelength tuning elements provided on the substrate, each of the plurality of wavelength tuning elements being associated with a corresponding one of the plurality of optical sources, each of the plurality of wavelength tuning elements being configured to adjust a corresponding one of the plurality of wavelengths in response to a corresponding one of the plurality of control signals.

8. An optical device in accordance with claim 7, wherein each of the plurality of wavelength tuning elements includes a thin film heater.

9. An optical device in accordance with claim 7, wherein the coupler is a first coupler, the optical device further including:
   a second coupler; and
   an optical combiner provided on the substrate, the optical combiner supplying a combiner output, the second optical coupler receiving the combiner output and supplying a portion of the combiner output as the WDM signal.

10. An optical device in accordance with claim 9, wherein the portion of the combiner output is a first portion of the combiner output, the optical device further including a variable optical attenuator (VOA) configured to selectively attenuate a second portion of the combiner output.

11. An optical device in accordance with claim 7, wherein each of the plurality of optical sources includes a distributed feedback laser.

12. An optical device, in accordance with claim 7, wherein the second optical filter includes an etalon.

13. An optical device in accordance with claim 7, wherein the first optical filter is selected from a group including a tunable micro-electromechanical system (MEMS)-actuated tunable filter, a tunable ring resonator, a tunable fiber bragg rating, a tunable Mach-Zehnder interferometer, a tunable etalon, and a tunable Michelson interferometer.

14. An optical device in accordance with claim 1, wherein the second optical filter includes an etalon.

15. An optical device in accordance with claim 1, wherein the first optical filter is selected from a group including a tunable micro-electromechanical system (MEMS)-actuated tunable filter, a tunable ring resonator, a tunable fiber Bragg grating, a tunable Mach-Zehnder interferometer, a tunable etalon, and a tunable Michelson interferometer.

16. An optical device in accordance with claim 1, wherein the first photodiode generates a sense signal, the sense signal being indicative of an optical power associated with the first optical output of the coupler.

17. An optical device in accordance with claim 1, wherein the first optical filter has a transmission spectrum that is swept over the plurality of wavelengths.

18. An optical device, comprising:
   a plurality of optical sources, each of the plurality of optical sources providing a corresponding one of a plurality of optical signals, each of the plurality of optical signals having a corresponding one of a plurality of wavelengths;
   an optical combiner configured to combine the plurality of optical signals into a wavelength division multiplexed (WDM) optical signal;
   a first coupler configured to receive the WDM optical signal and supply a first part of the WDM optical signal and a second part of the WDM optical signal;
   a first filter, the first filter being tunable and configured to receive the first part of the WDM optical signal and successively supply portions thereof;
   a second coupler configured to receive the successively supplied portions of the first part of the WDM optical signal, the second coupler supplying a first optical output and a second optical output;
   a first photodiode configured to sense the first optical output of the second coupler and supply a first sense signal indicative of optical powers associated with the successively supplied portions of the first part of the WDM optical signal;
   a second filter configured to pass a portion of the second optical output;
   a second photodiode configured to sense the second optical output and supply a second sense signal;
   a control circuit configured to receive the first and second sense signals, and output a plurality of control signals, each of the plurality of wavelengths being adjusted in response to a corresponding one of the plurality of control signals.

19. An optical device in accordance with claim 18, wherein the second filter includes an etalon.

20. An optical device in accordance with claim 18, further including:
   a third optical coupler configured to receive the second part of the WDM optical signal; and
   a third photodiode configured to sense a portion of the second part of the WDM optical signal.

21. An optical device in accordance with claim 18, further including:
   a variable optical attenuator that attenuates the second part of the WDM optical signal;
   a third optical coupler, the variable optical attenuator supplying the attenuated second part of the WDM optical signal to the third optical coupler; and
   a third photodiode configured to sense a portion of the attenuated second part of the WDM optical signal.

22. A method, comprising:
   receiving a wavelength division multiplexed (WDM) signal with a first optical filter, the first optical filter being tunable, the WDM signal including a plurality of optical signals, each of which having a corresponding one of a plurality of wavelengths;
   sweeping a passband of the tunable optical filter over a wavelength range, the wavelength range including the plurality of wavelengths, such that the tunable optical filter outputs successive portions of the WDM signal;
   dividing each of the successive portions of the WDM signal into a first part and a second part;
   sensing the first part of each of the successive portions of the WDM signal with a first photodiode and generating a first sense signal in response thereto;
   sensing the second part of each of the successive portions of the WDM signal with a second photodiode and generating a second sense signal in response thereto; and
   controlling each of the plurality of wavelengths based on the first and second sense signals.

23. A method in accordance with claim 22, wherein the sweeping the passband includes:
   applying a voltage having a predetermined value to the tunable filter;
   ramping the voltage to thereby change a center wavelength of the passband; and
   resetting the voltage to have the predetermined value,
   wherein the ramping the voltage occurs over a first time interval, and the resetting the voltage occurs over a second duration of time, the first time interval being longer than the second time interval.

* * * * *